United States Patent [19]

Ackeret

[11] Patent Number: 4,754,564

[45] Date of Patent: * Jul. 5, 1988

[54] DEVICE FOR THE CYCLIC REARRANGEMENT OF A PILE OF RECTANGULAR OR SQUARE SHEETS

[75] Inventor: Peter Ackeret, Kusnacht, Switzerland

[73] Assignee: Licinvest AG, Chur, Switzerland

[*] Notice: The portion of the term of this patent subsequent to Oct. 15, 2002 has been disclaimed.

[21] Appl. No.: 901,533

[22] PCT Filed: Nov. 12, 1985

[86] PCT No.: PCT/EP85/00613

§ 371 Date: Jul. 11, 1986

§ 102(e) Date: Jul. 11, 1986

[87] PCT Pub. No.: WO86/03027

PCT Pub. Date: May 22, 1986

[51] Int. Cl.⁴ .............................................. G09F 11/30
[52] U.S. Cl. ........................................ 40/513; 40/642; 40/490; 40/380
[58] Field of Search ............... 40/511, 513, 10 R, 490, 40/380

[56] References Cited

U.S. PATENT DOCUMENTS

| | | | |
|---|---|---|---|
| 405,720 | 11/1877 | Weggelane | 40/513 |
| 472,702 | 4/1892 | Fichtner | 40/513 |
| 3,122,844 | 3/1964 | Kharasch | 40/513 |
| 3,225,471 | 12/1965 | Hallsburg | 40/513 |
| 4,241,528 | 12/1980 | Ackeret | 40/513 |
| 4,259,802 | 4/1981 | Ackeret | 40/513 |
| 4,376,348 | 3/1983 | Ackeret | 40/513 |
| 4,546,561 | 11/1985 | Ackeret | 40/513 |
| 4,550,516 | 11/1985 | Ackeret | 40/513 |

FOREIGN PATENT DOCUMENTS 3014394 10/1981 Fed. Rep. of Germany .
3342238 6/1984 Fed. Rep. of Germany .
2403207 4/1979 France .

Primary Examiner—Gene Mancene
Assistant Examiner—Wenceslao J. Contreras
Attorney, Agent, or Firm—Robert R. Jackson

[57] ABSTRACT

The invention relates to a device for the cyclic rearrangement of a pile of rectangular or square sheets, especially a pile of photographic prints, having a first (12) and a second (14) frame part which may be moved relative to one another and parallel to the main plane of the pile, and having means that, on movement of the frame parts backwards and forwards, remove an individual sheet from one end of the pile and add it to the other end of the pile again, these means comprising:

(a) a separating means (20/266) for separating the individual sheet (188) from the pile,
(b) a feeding means (460) for feeding sheets to the separating means,
(c) retaining means (460/20) for holding the individual sheet in the first frame part and the remainder of the pile in the other frame part, and
(d) a guide means (386) for guiding the separated individual sheet for the purpose of returning it to the other end of the remainder of the pile, wherein the feeding means and the retaining means for holding the individual sheet are formed by a transporter (460) engaging the rear edge (seen in the feeding direction) of the sheet to be separated and wherein a pressure arrangement (476) is provided on the side of the pile remote from the transporter, wherein the device is designed for piles having different numbers of sheets, the pressure arrangement holds the sheet being separated in engagement with the transporter until the latter enters the separating means, and wherein the guide means comprise means (490) which, controlled by the movement of the frame parts, permit the introduction of the individual sheet between the pressure arrangement and the pile.

15 Claims, 13 Drawing Sheets

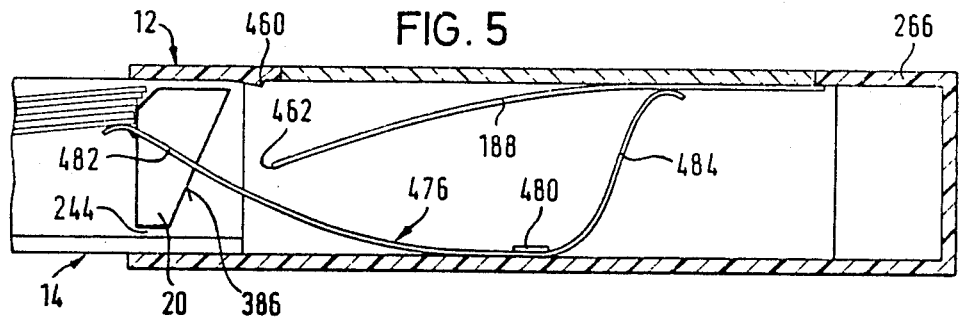
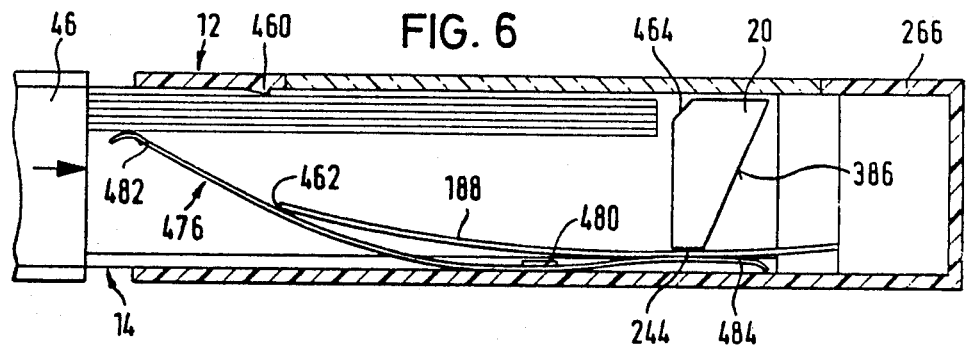
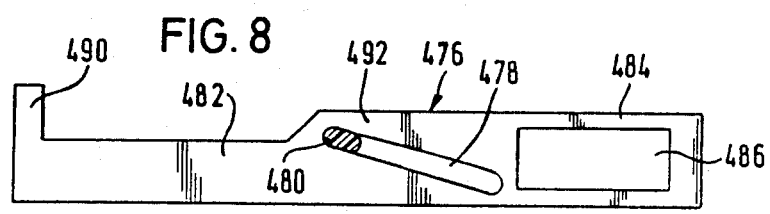
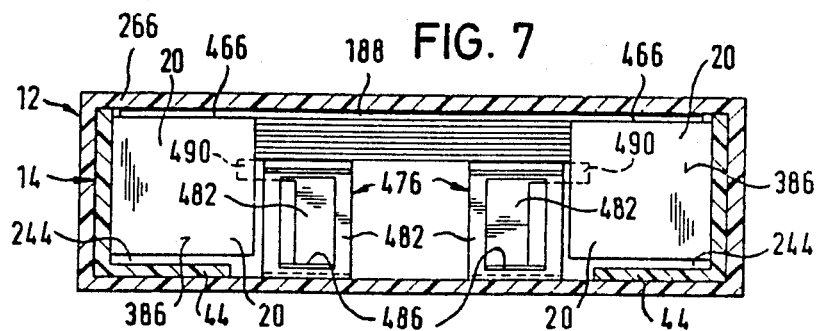

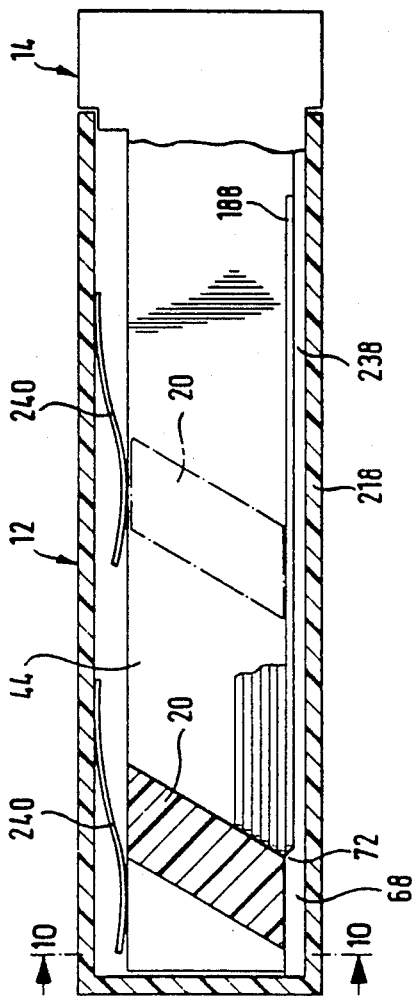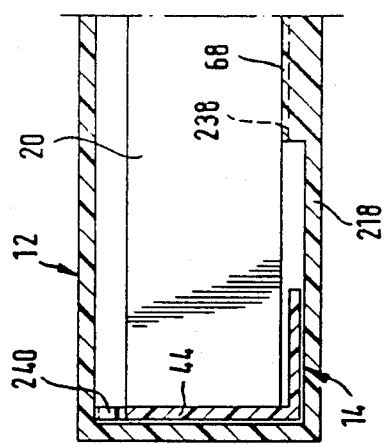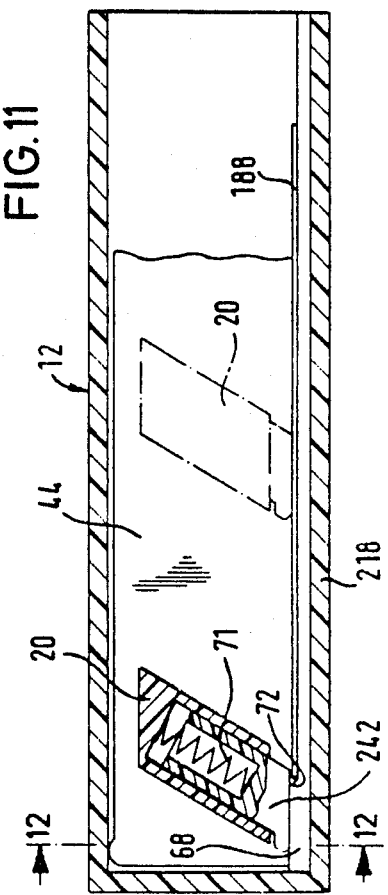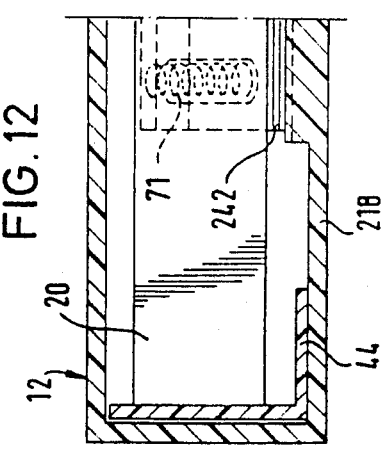

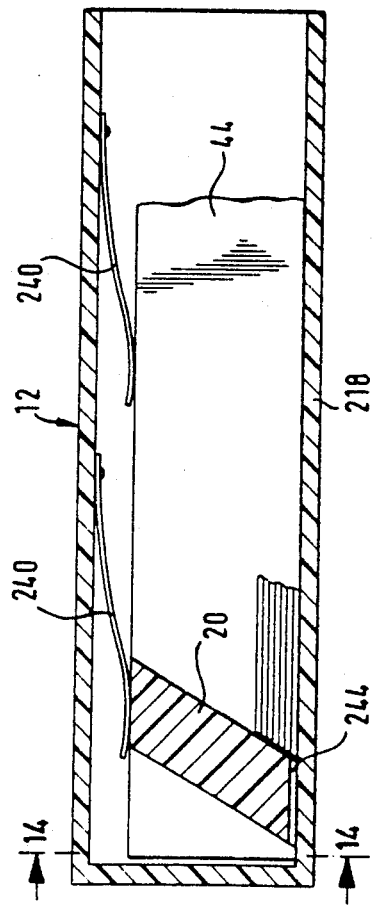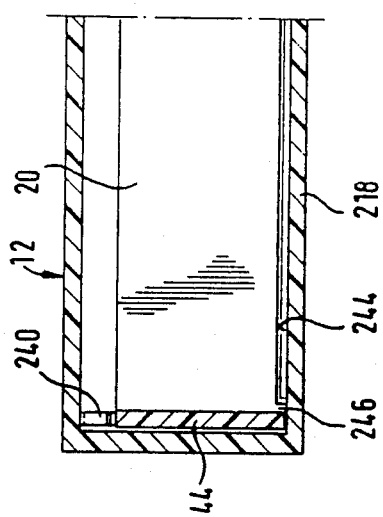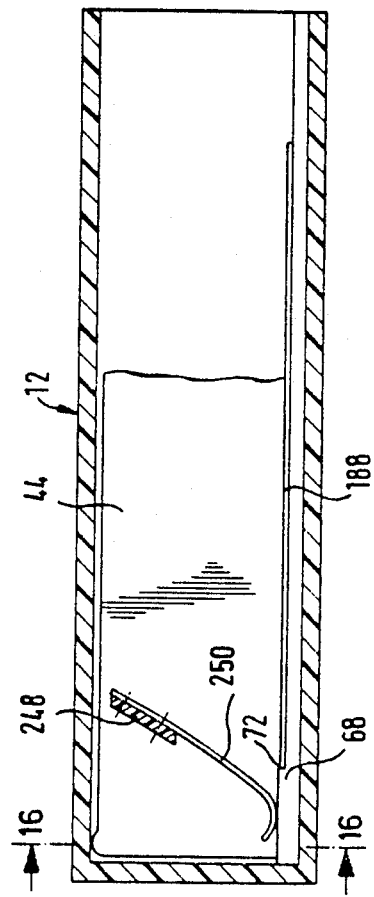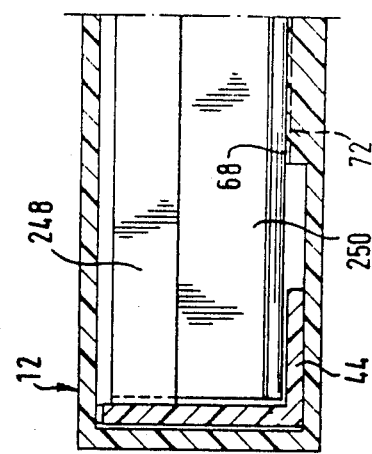

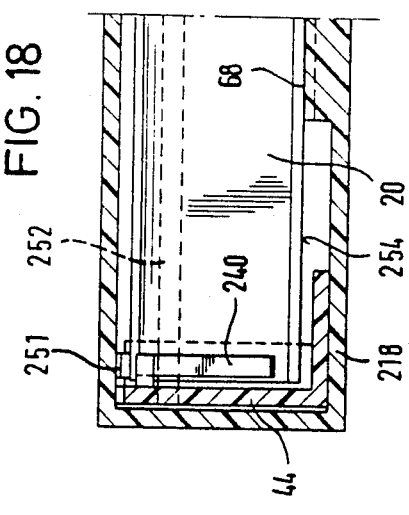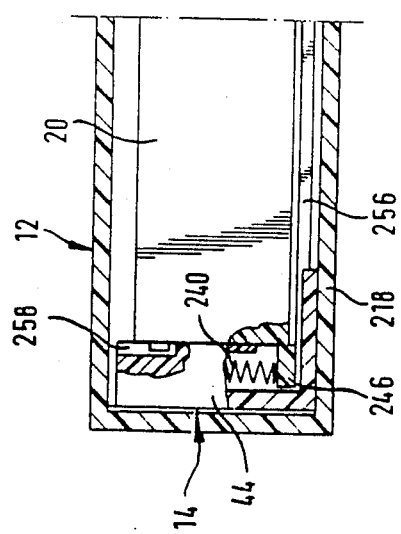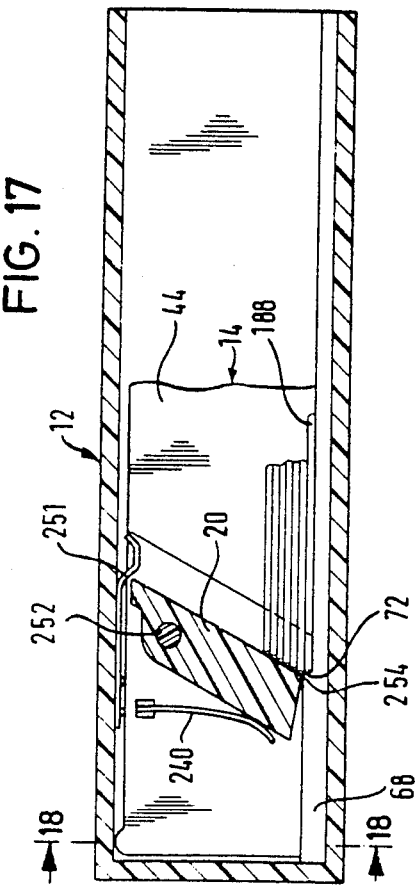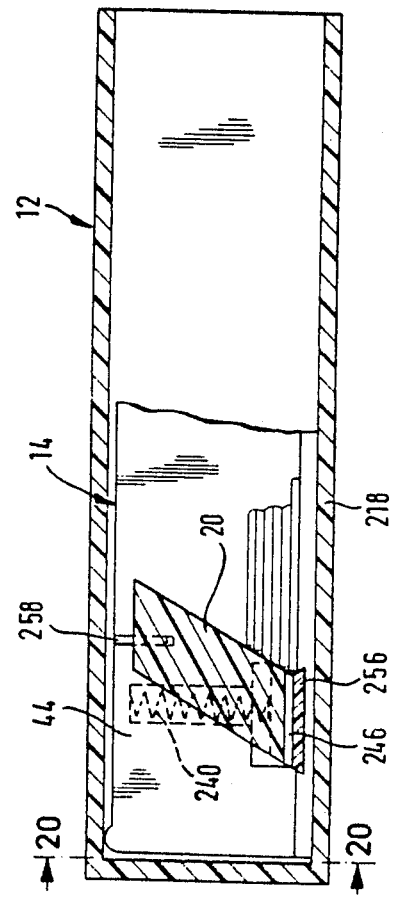

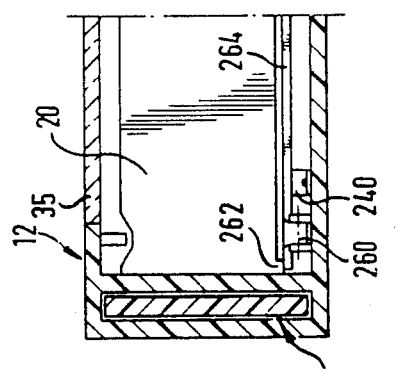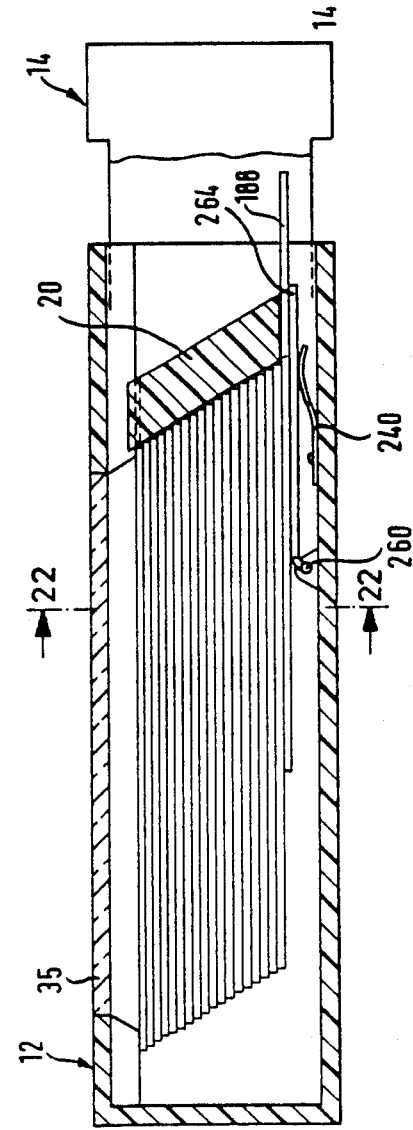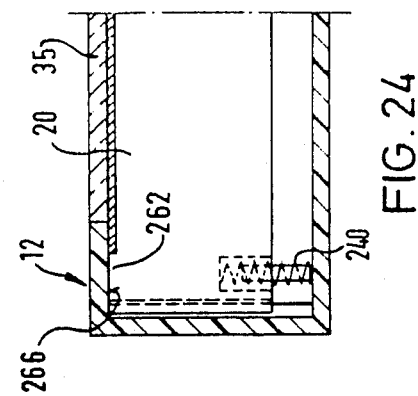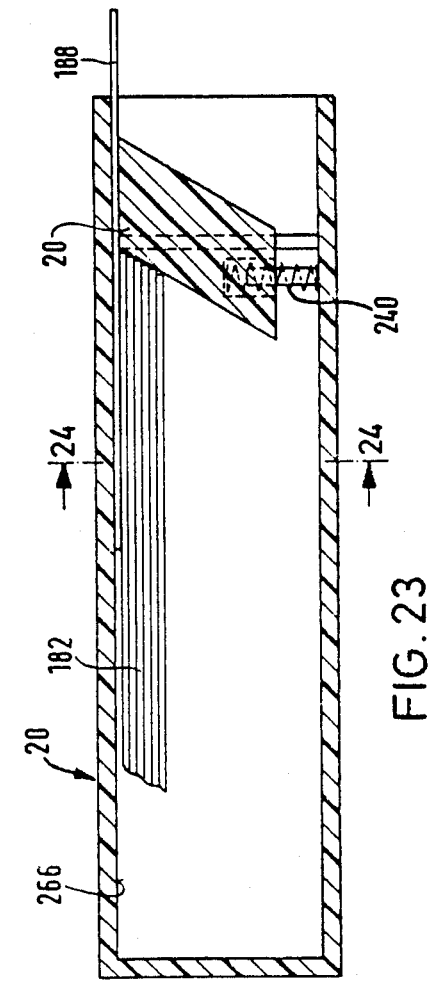

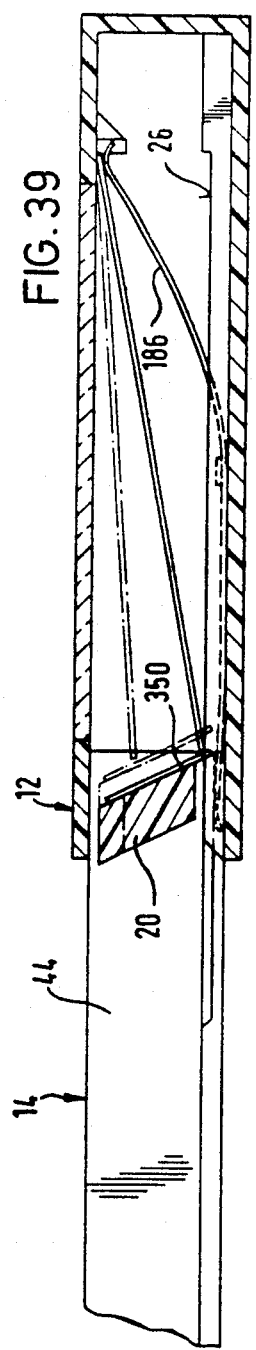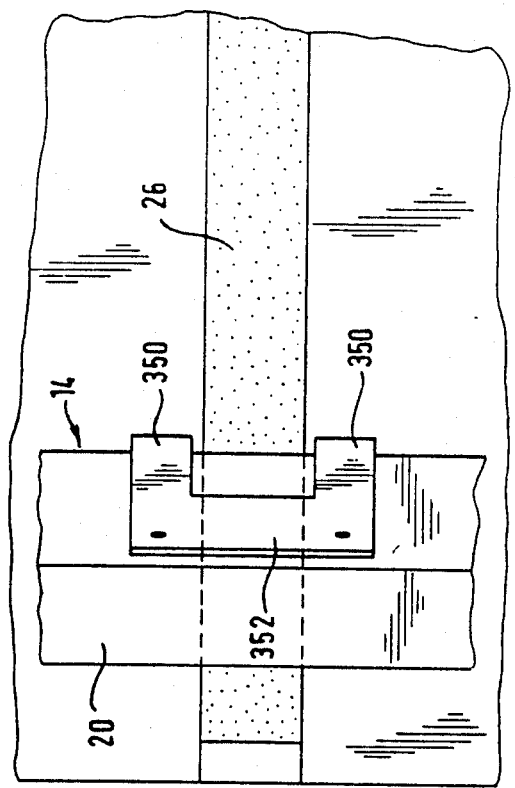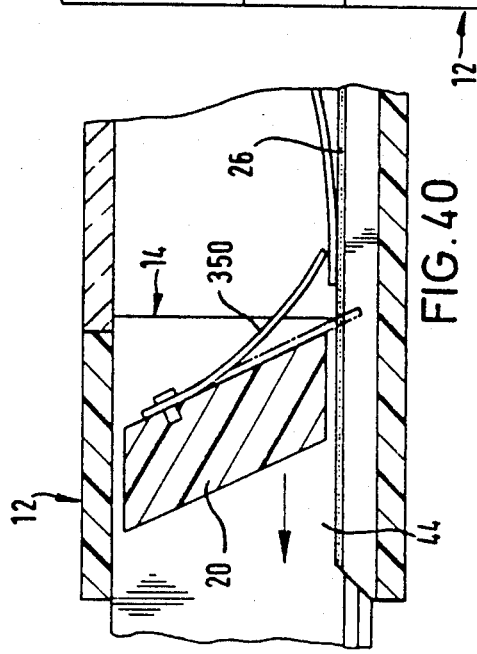

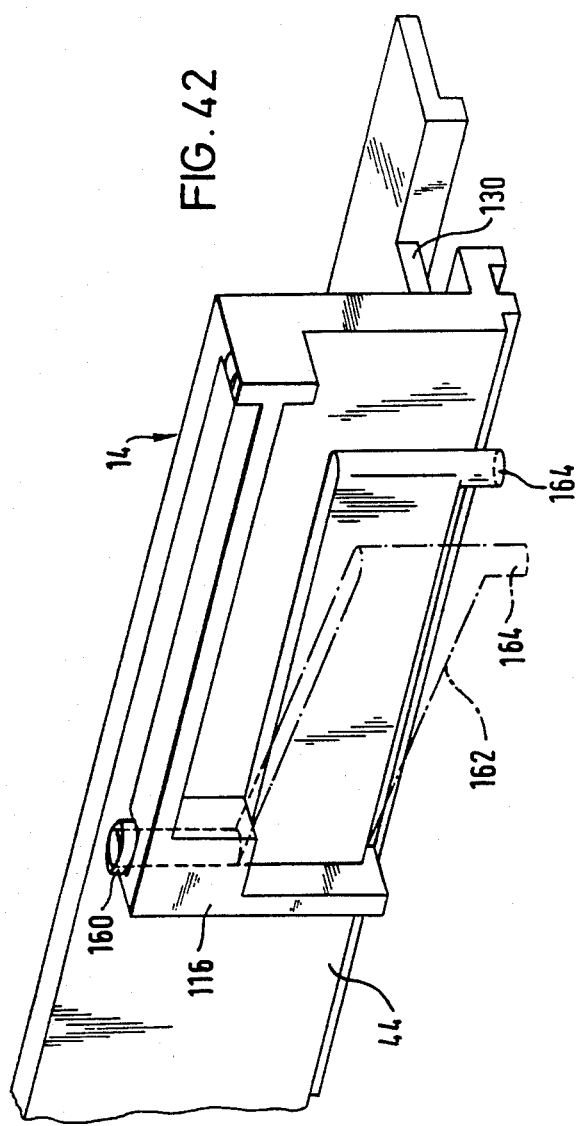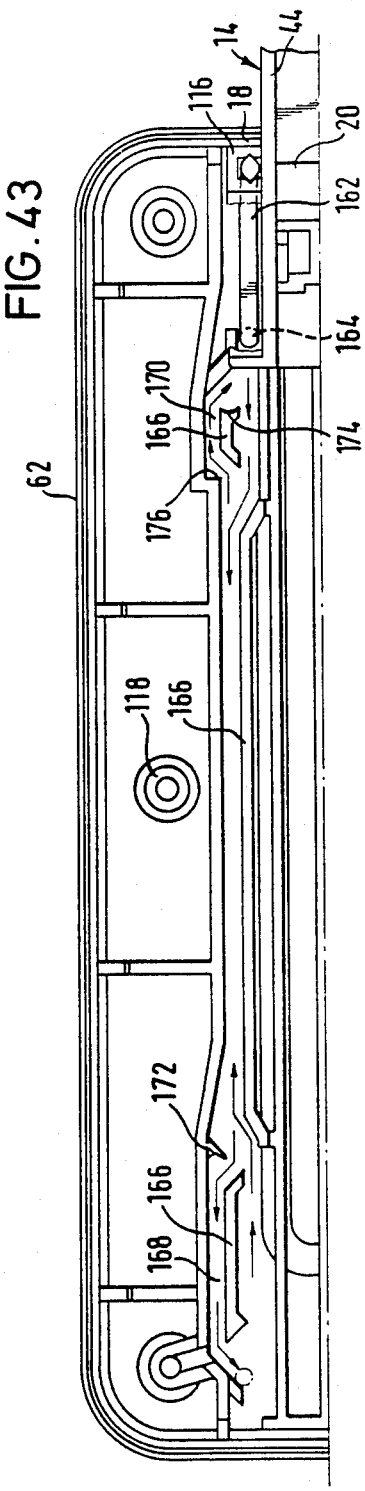

DEVICE FOR THE CYCLIC REARRANGEMENT OF A PILE OF RECTANGULAR OR SQUARE SHEETS

The invention relates to a device for the cyclic rearrangement of a pile of rectangular or square sheets, or a so-called "picture-changer".

Picture changers are known from U.S. Pat. Nos. 4,238,898, 4,238,899, 4,241,528, 4,241,529, 4,245,417, 4,259,802 and 4,276,348. These specifications are all based on the principle that a pile of pictures especially photographic prints, is held by two frame parts that are movable relative to one another, one of which may have a viewing window. During each complete cycle of movement of the frame parts, that is, pulling them fully away from each other and sliding them fully back together again, one picture is removed from one end of the pile and returned to the other end of the pile again. The picture changers have the following components for this:

A feeding means feeds pictures to a separating means; the separating means detaches an individual picture from the pile; a retaining means holds the individual picture separated from the pile in one of the frame parts whilst the remainder of the pile is held in the other frame part; a guide means guides the separated individual picture such that it goes onto the other end of the remainder of the pile.

In the known picture-changers, there is provided as feeding means a retentive coating that makes surface-engagement with the sheet to be separated.

In earlier sheet-changers, made known from printed publications, a hook-like or strip-like transporter is used which engages the edge of the pile remote from the separating means, a pressure arrangement ensuring engagement. This earlier form of construction may be useful for stiff cards, especially when the number of cards forming the pile needs to be varied only within narrow limits.

The aim of the present invention is to provide a changer of this type which can be used for photographs.

In the case of photographs, conditions occur which the known changers fail to meet. The photographs are very thin, having a thickness of approximately 0.25 mm, consist of a paper/plastics laminate and therefore tend both to build up a static charge in dry atmospheres and to become sticky in moist atmospheres so that in both cases surprisingly high shearing forces may be required in order to separate two photos lying one on top of the other in the pile. As a result of the laminate construction described, the photos also become warped and bowed depending on the temperature and atmospheric moisture.

If it were desired to use the known devices unaltered for photographs, then the change system would fail: The transporter in the form of a hook or strip would not be able to hold the sheet to be separated securely and would slip off at some point during the feed travel. Although an increase in the pressure of the pressure arrangement would possibly improve somewhat the chances of the removal of the sheet from the pile, this would result in increased difficulties when returning the sheet to the pile.

According to the invention, this problem is solved by a device for the cyclic rearrangement of a pile of rectangular or square sheets, especially a pile of photographs, having a first and a second frame part which may be moved relative to one another and parallel to the main plane of the pile, and with means that, on movement of the frame parts backwards and forwards, remove an individual sheet from one end of the pile and add it to the other end of the pile again, these means comprising:
    (a) a separating means for separating the individual sheet from the pile,
    (b) a feeding means for feeding sheets to the separating means,
    (c) retaining means for holding the individual sheet in the first frame part and the remainder of the pile in the other frame part, and
    (d) a guide means for guiding the separated individual sheet for the purpose of returning it to the other end of the remainder of the pile, wherein the retaining means for holding the individual sheet comprises a transporter engaging the rear edge (seen in the feeding direction) of the sheet to be separated, and there is provided on the side of the pile remote from the transporter a pressure arrangement which, at least over part of the travel of the frame parts, holds the sheet being separated in engagement with the transporter and wherein the guide means comprise means which, controlled by the movement of the frame parts, enable the introduction of the individual sheet between the pressure arrangement and the pile.

Accordingly, provision is firstly made for the pressure arrangement to hold the sheet being separated constantly in engagement with the transporter exactly in the region where the transporter acts on the sheet. In this manner the transporter can convey the sheet reliably to the separating means and even transport it into a position where it has come free of the pile. In this position of the two frame parts, the pressure arrangement is then directly in the region of the separating means (since the transporter is also there) and during the return travel of the frame parts the individual picture must now be introduced between the pressure arrangement and the pile. For geometric reasons, however, this is not possible without damaging the individual sheet, unless, in addition, the insertion of at least the leading edge of the individual sheet is facilitated preferably by influencing the pressure arrangement, as a function of the relative movement of the frame parts.

The concept according to the invention is explained in detail below with reference to the accompanying drawings.

FIG. 5 is still another partial view similar to FIG. 2 showing the condition of the device of FIG. 2 with the slider fully withdrawn.

FIG. 6 is yet another partial view similar to FIG. 2 showing the condition of the device of FIG. 2 with the slider partly pushed back into the housing.

FIG. 7 is a tranverse sectional view of the device shown in FIGS. 1-6 taken in a plane perpendicular to the plane of FIGS. 1-6.

FIG. 8 is a top view, partly in section, of a portion of the device shown in FIGS. 1-7.

FIG. 9 is a view similar to FIG. 2 showing a second alternative embodiment of the invention.

FIG. 10 is a partial sectional view taken along the line 10—10 in FIG. 9.

FIG. 11 is a view similar to FIG. 9 showing another alternative embodiment of the invention.

FIG. 12 is a partial sectional view taken along the line 12—12 in FIG. 11.

FIG. 13 is a view similar to FIG. 11 showing yet another alternative embodiment of the invention.

FIG. 14 is a partial sectional view taken along the line 14—14 in FIG. 13.

FIG. 15 is a view similar to FIG. 13 showing still another alternative embodiment of the invention.

FIG. 16 is a partial sectional view taken along the line 16—16 in FIG. 15.

FIG. 17 is a view similar to FIG. 15 showing yet another alternative embodiment of the invention.

FIG. 18 is a partial sectional view taken along the line 18—18 in FIG. 17.

FIG. 19 is a view similar to FIG. 17 showing still another alternative embodiment of the invention.

FIG. 20 is a partial sectional view taken along the line 20—20 in FIG. 19.

FIG. 21 is a view similar to FIG. 19 showing yet another alternative embodiment of the invention.

FIG. 22 is a partial sectional view taken along the line 22—22 in FIG. 21.

FIG. 23 is a view similar to FIG. 21 showing still another alternative embodiment of the invention.

FIG. 24 is a partial sectional view taken along the line 24—24 in FIG. 23.

FIG. 39 is a partial longitudinal sectional view of a further embodiment.

FIG. 40 is an enlarged detail of a portion of FIG. 39.

FIG. 41 is a partial top view into the bottom of the FIG. 39 embodiment.

FIG. 42 is a perspective view of a component which can be used in any of the foregoing embodiments.

FIG. 43 is a partial top plan view into the housing bottom and slider suitable for use in any of the foregoing embodiments.

The Figures are to a large extent schematic and are limited to the essential. In so far as they show no complete picture changer, the person skilled in the art can take the required supplementary information from the publications mentioned at the beginning. In addition, the basic principle explained with reference to FIGS. 1 to 8 is not shown in the later Figures. Finally it should be noted that the person skilled in the art, having considered the publications mentioned at the beginning, can recognise without difficulty which form of representation has been selected in each case, that is to say longitudinal section or cross-section, partial view, truncated perspective, etc. Where not immediately obvious, the manner of representation is given in the description of the relevant Figure.

Figure 1:
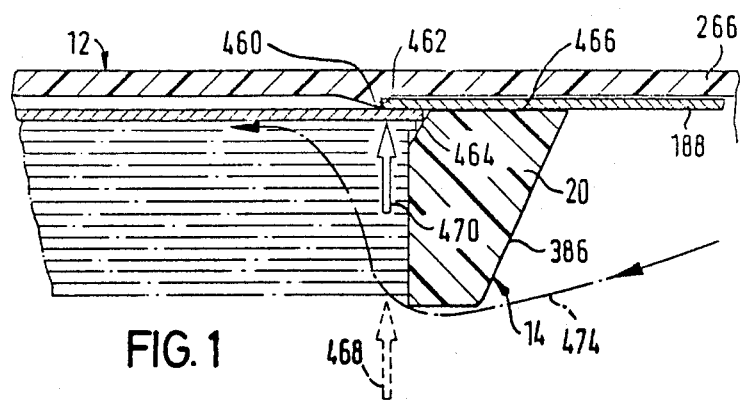
FIG. 1 is a partial longitudinal sectional view of a device constructed in accordance with the invention.
Figure 2:
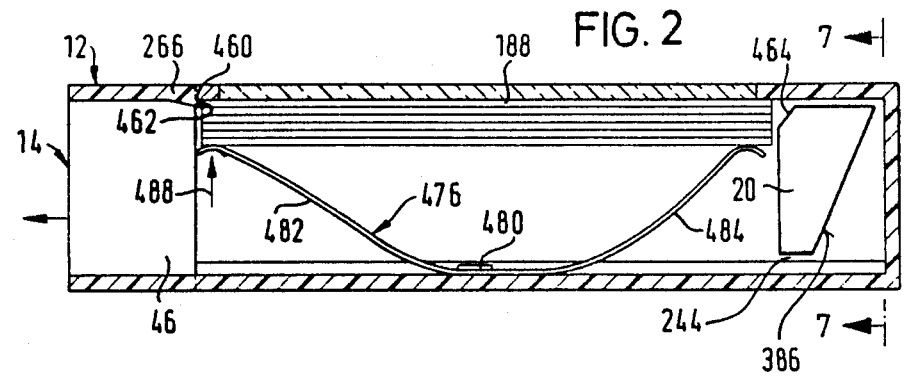
FIG. 2 is a complete longitudinal sectional view of the device shown in FIG. 1.
Figure 3:
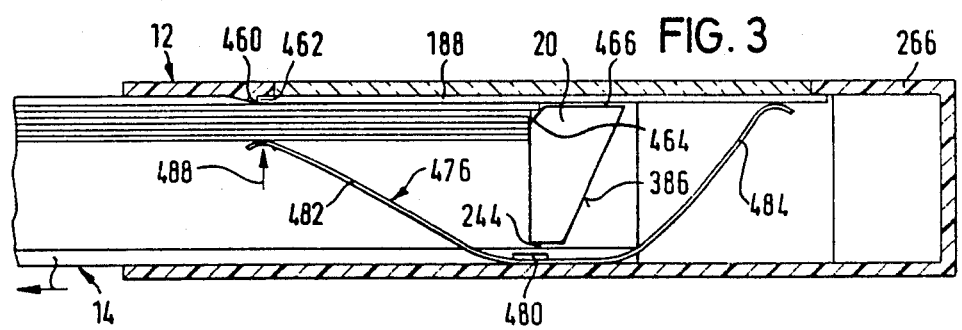
FIG. 3 is a partial view similar to FIG. 2 showing the condition of the device of FIG. 2 after partial withdrawal of the slider.

FIG. 1 shows the cooperation of a transporter 460 which seves as feed member and is in the form of a hook or ledge which engages behind the rear edge 462 (seen in the direction of movement) of a sheet to be separated. The separating means comprises a separator 20 having an inwardly-running slope 464. The sheet 188 is pushed through between the upper side 466 of the separator and the top wall 266 of a frame part. To ensure that the sheet and transporter engage, there operates in the region immediately in front of the separator (seen in the feed direction) a pressure arrangement, symbolised in this case by arrows which indicate the direction of action of the arrangement. Depending on the number of sheets in the pile, the pressure arrangement is far beneath the through gap (interrupted arrow 468) defined by the parts 466, 266 or, if only a few sheets are in the pile, is quite close beneath the transporter (thick arrow 470). When the separated sheet has been conveyed by the transporter to behind the rear side of the separator bar, its trailing transverse edge 472 comes free and moves downwards against the direction of action of the pressure arrangement or is displaced there by auxiliary means (not shown) so that this edge can be inserted again between the pressure arrangement and the pile. It will be seen that in the situation shown this could be extremely complicated since this edge must travel a path approximately along the parth 474, shown by broken lines, with considerable deformation of the sheet.

FIGS. 2-8 show how this problem is solved.

Figure 4:
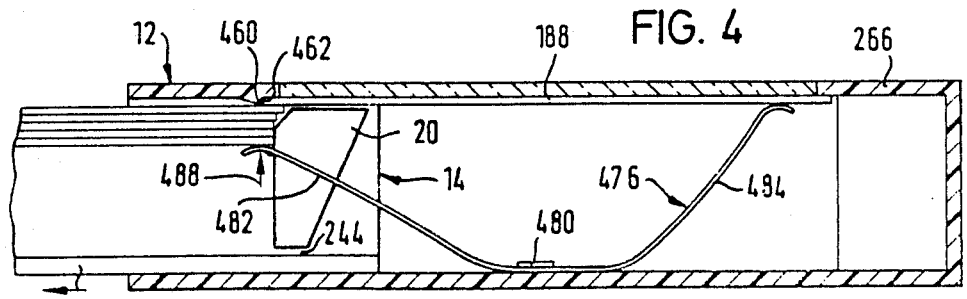
FIG. 4 is another partial view similar to FIG. 2 showing the condition of the device of FIG. 2 after further withdrawal of the slider.

One frame part is in the shape of a housing 12, the other frame part is a slider member 14 which can travel a predetermined withdrawal distance relative to the housing; the fully extended position is shown in FIG. 4. The transporter 460 is moulded onto the top wall 266 of the housing. The pressure arrangement comprises two parallel double-armed leaf springs 476. These springs have a configuration according to FIG. 7: An inclined longitudinal slot 478 sits on an oblong guide member 480 which is moulded onto the floor of the housing. The spring arm 482 which rests against the pile from below almost directly under the transporter is designed to be so strong that the pile is securely held against the transporter even when there are many sheets. The other spring arm 484 is weakened by a cut-out portion 486 and is therefore considered "softer" since in the starting position according to FIG. 1 the sheet to be changed is guided by the slope 464 into the through passage, even when the pressure is only slight.

It can be seen in FIG. 7 that the separator bar 20 does not extend over the entire breadth of the slider member 14 on which it is moulded, but has a cut-out portion in the middle so that when the slider member 14 is pulled out of the housing 12 the springs of the pressure arrangement can pass between the two parts of the separator bar.

From the beginning of the movement of the frame parts (FIG. 2) up to almost the complete extension (FIG. 5) the pressure, symbolised by the arrow 488, remains directly under the transporter. In the position according to FIG. 4, each of the parts of the separator bar 20 run onto an outwardly turned finger 490, and during the passage of the slider member from the position according to FIG. 4 into the position according to FIG. 5 the two leaf springs 476 are slidably transported along the guide member 480. Owing to the inclined position of the longitudinal slot 478, the springs are displaced in the direction of movement of the slider member but also slightly outwards; however, they remain substantially parallel to the direction of movement.

As a result of this displacement in the direction of movement, on the side of the housing remote from the parts of the separator bar in FIG. 5, the separated sheet 188 is pushed upwards by the spring arms 484 against the top wall 266 of the housing, while its edge 462 comes free and hangs down or is pressed downwards by auxiliary means.

If, starting from FIG. 4, the slider member 14 is pushed in again, then this edge 462 passes downwards along the inclined face 386 of the parts of the separator bar until it is in front of the through gap 244 and passes into the latter, while the spring arm 482 slides with its free end along the lowest sheet of the pile, but always forward of the edge 462 of the sheet 188 corresponding to the displacement of the longitudinal slot system.

The second consequence of this displacement, namely in the outward direction, is that the parts of the separator bar 20 run onto the laterally projecting spring-depresser portions of the spring arms 484 and, since they are relatively "soft", press them downwards without impeding the movements of the frame parts, so that even the rear edge of the sheet to be conveyed back under the pressure arrangement comes free.

Shortly before reaching the starting position, some part of the slider member 14, for example the grip part 46, runs onto the spring arms 482 or the fingers 490 and presses the leaf springs back again into the starting position, according to the longitudinal slot system. At the same time, the end of the spring arm 482 slides gently under the edge 462 of the sheet which has now been conveyed back underneath the pile.

FIGS. 9 to 24 show alternative separating means.

It is common to all the embodiments shown here that the through gap for the entry of the sheet being separated is fixed by means of a mechanical stop member to the defined value of the passage spacing. During the further course of the changeover cycle, the passage spacing may either be also maintained by means of a system of stop members, or the gap may close resiliently over the separated sheet, so that the latter itself defines the passage spacing.

FIG. 9 shows a photograph changer in a schematic longitudinal sectional view, and FIG. 10 is a corresponding partial transverse section. The first frame part is in the form of a housing 12 on which a first, stationary separating member is moulded in the form of a rib 238 which is located on the floor 218 of the housing. The second separating member is formed by a separator bar 20 which is moulded on a slider member 14 displaceable relative to the housing and forming the second frame part. The slider member 14 is pressed in the direction of the floor of the housing, and thus in the direction of the ribs 238, over its entire withdrawal travel distance by a system of leaf springs 240 which is mounted in the housing.

When the slider member is completely pushed in, however, the separator bar meets a land 68 which is higher by a good photograph-thickness than the rib 238 with which the spacing of the gap is defined. After the edge 72 of the land 68 has been passed, the springs 240 press the separator bar 20 as far as the surface of the separated sheet 188 which faces towards it. In FIG. 10 can also be seen the side pieces 44 of the slider member, between which the separator bar extends and on which it is integrally formed.

The embodiment according to FIG. 11 (longitudinal section) and FIG. 12 (partial transverse section) differs from that described previously in that not the whole slider member 14 but only a part 242 of the separator bar 20 is pressed in the direction of the floor of the housing 218 by a spring arrangement 71 housed in the separator bar itself, while the slider member is supported in this direction. The operation is otherwise the same.

The embodiment according to FIG. 13 (longitudinal section) and FIG. 14 (transverse section) differs from that according to FIGS. 9 and 10 in that although in this case the slider member is in fact pressed by the system of leaf springs 240 in the direction of the floor of the housing 218, no land is provided on the housing; instead there are moulded onto the separator bar 20, on both sides of the gap 244 for the passage of the sheets, shoes 246 which are supported on the floor 218 of the housing and thus constantly keep the spacing of the gap at the desired value.

The embodiment according to FIGS. 15 (longitudinal section) and 16 (partial transverse section) is a modification of the embodiment in FIGS. 11 and 12. Between the side pieces 44 of the slider member a fixing device 248 is provided which holds a stationary end of a resilient leaf spring 250 clamped in by its wide side. The rounded end of the leaf spring touches the land 68 and after the edge 72 of the latter has been passed moves onto the separated sheet 188.

The embodiment according to FIG. 17 (longitudinal section) and FIG. 18 (partial transverse section) also has a separating member which can be resiliently deflected relative to the slider member 14 and is in the form of a separator bar 20 which is pivotable about a shaft 252 in the side pieces 44 of the slider member, but is held by means of a spring arrangement 240 with its edge 254 resting against the part situated opposite, that is to say, firstly on the land 68 and then, after its edge 72 has been passed, on the separated sheet 188.

The embodiment according to FIG. 19 (longitudinal section) and FIG. 20 (partial transverse section) comprises as the first frame part a housing 12, and as the second frame part a slider member 14. Between the side pieces 44 of the slider member a foot plate 256 is inserted which forms a first separating member. The second separating member is a separator bar 20 which is biased relative to the slider member in the direction of the floor 218 of the housing by a spring arrangement 240, is guided on rails 258, and has stop shoes 246 on its lower end on both sides of the sheet which is to be separated.

FIGS. 21 (longitudinal section) and 22 (partial transverse section) show an embodiment in which the first frame part is formed by a slider member 14 which can slide backwards and forwards relative to a housing 12 as the second frame part. It is to be understood that here again, as with all other embodiments, the maximum travel of the slider member is limited by means of stop members, which are not however shown, for the sake of clarity. Formed in one piece with the housing 12 as the first separating member there is a separator bar 20 opposite which a second separating member is provided in the form of a plate 264 with an articulated mounting (link 260) which plate is pressed by a spring 240 agaisnt lateral support projections 262 of the separator bar. The plate 264 can therefore absorb manufacturing tolerances, while the gap height is fixed by means of the height of the projections 262, which is practically invariable.

FIGS. 23 (longitudinal section) and 24 (partial transverse section) slow an embodiment in which the housing 12 forms the second frame part and a slider member (not shown) the first frame part. A separator bar 20 is guided on the housing so that it can slide transversely with respect to the principal plane of the pile and is biased by means of a spring arrangement 240. With its support projections 262 it defines the gap height, which is defined on the other side by means of the top wall 266 of the housing.

Figure 25:
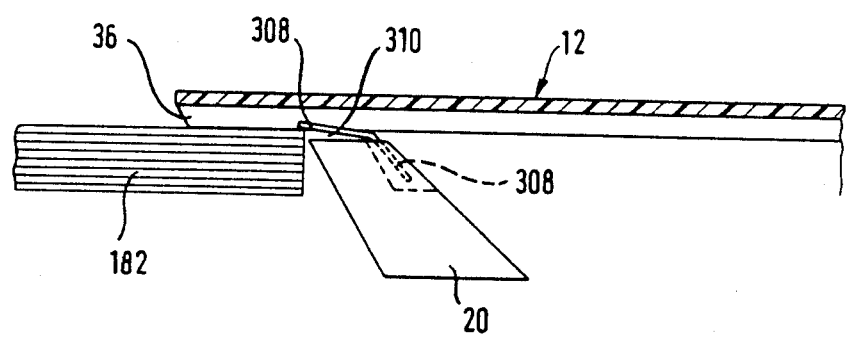
FIG. 25 is a partial longitudinal sectional view showing a detail of the device.

FIG. 25 shows in a schematicised longitudinal sectional view a type of construction which both holds down the remainder of the pile for the insertion of the separated sheet and also blocks the return gap during the start of the changeover cycle: In the separator bar 20 provided as separating emans, a thin, resilient plate-like part 308 is arranged which engages, between holding-down members 36, on a top wall of the first frame part. The free end of the plate-like part at the same time presses on the sheet of the remainder of the pile 182 which faces towards it. The plate is supported in the second frame part so that it is displaceable for a short distance in the direction of movement of the frames, so that at the start of the next changeover cycle it can deflect towards the left (in FIG. 25), but at the same time still blocks the gap 310 so that the sheet returned last is pressed onto the remainder of the pile by the holding-down member before the plate-like part is moved in again.

Figure 26:
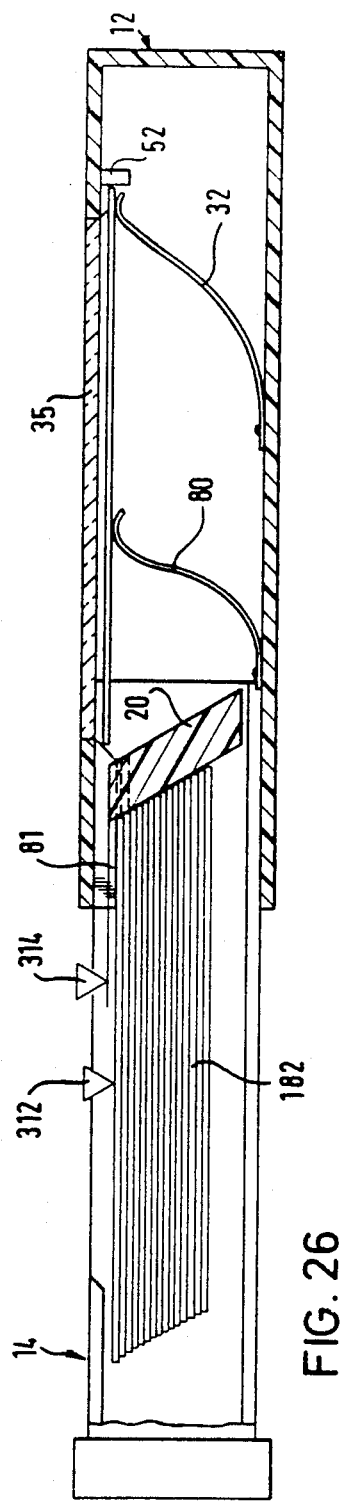
FIG. 26 is a longitudinal sectional view showing a further embodiment of the device of this invention with the slider withdrawn.

FIG. 26 shows in a schematicised sectional view the preferred means: the spring 32 holds the rear edge of the sheet in front of the slider member stop member 52, the spring 80 supports the sheet approximately centrally, and behind the separator bar 20 the remainder of the pile 182 is held on a level according to the arrow 312, by the holding-down members 81 acting on it. The arrow 314 defines the level of that edge of the separator bar over which the individual sheet passes and which is in an inter-engaging engagement with the holding-down members.

Figure 27:
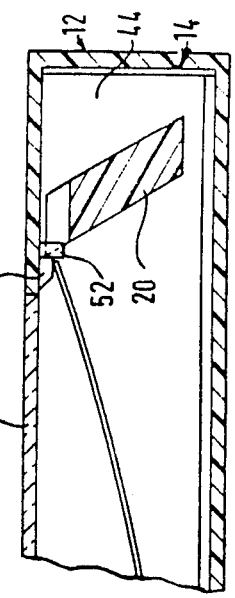
FIG. 27 shows a detail of FIG. 26 with the slider pushed back into the housing.

FIG. 27 shows in a schematic partial sectional side view a construction which serves to prevent a sheet also arriving incorrectly in the gap during the separating phase of the changeover cycle at the through gap for the return of the sheet. In this case, this requires the ribs 40, which engage (somewhat like the teeth of a comb) in recesses in the separator bar 20.

Figure 28:
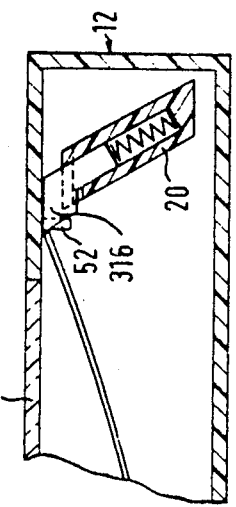
FIG. 28 is a view similar to FIG. 27 showing another alternative embodiment.

Alternatively, in FIG. 28 blocking members 316 moving out of the separator bar are shown which free the through gap (either by spring action as the result of running on an actuating means or by positive displacement) only when a sheet edge is present in the return phase (this may be thought of as a "non-return valve principle").

The following Figures relate to means to ensure the sheet return itself. As mentioned, the individual sheet is preferrably pushed through the gap with its rear edge resting against a stop member. When the sheet is bowed round a radius of curvature which is approximately perpendicular to the direction of movement, there is a risk that the sheet will not be pushed through the gap but will be squashed up and/or will slide away from the stop member.

In principle, therefore, in the case of the guide means such means are provided which hold the individual sheet as securely as possible in front of the "pushing" stop member, and/or means which compensate for or reduce any bowing of the photographs.

Figure 29:
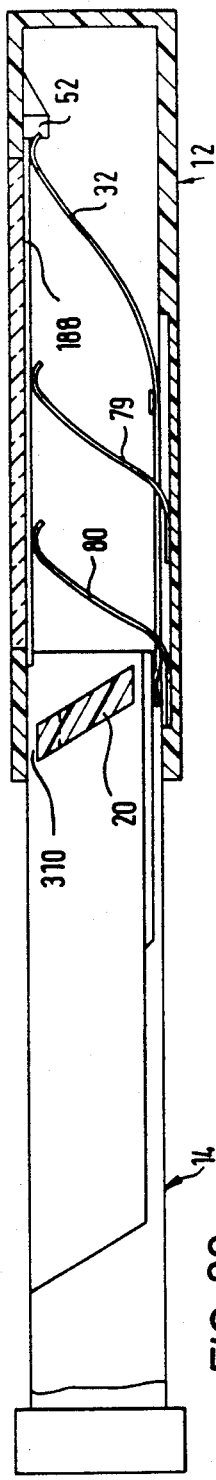
FIG. 29 is a longitudinal sectional view showing yet another alternative embodiment with the slider withdrawn.

FIG. 29 shows these means just in principle in a schematicised longitudinal section: a first leaf spring 32 holds the individual sheet 188 in front of the "pushing" stop member 52, and further leaf springs 79, 80 press the sheet as flat as possible against the top wall of the housing 12 (first frame part), in order to present the leading edge of the individual sheet fairly accurately in front of the through gap 310. Reliability will be so much the greater, the longer the leaf springs engage with the individual sheet during the sheet return, before these springs are passed over by the separator bar 20 of the separating means. The side of the separator bar which faces towards the individual sheet 188 is preferably inclined in such a way that a leading edge of the individual sheet which is bowed downwards in front of it can "climb up" along the incline as a result of the camming effect of the latter. But if this sheet edge is forcibly presented to the return gap by other means, the corresponding surface of the separator bar may also be constructed to run perpendicular to the plane of the sheet.

Figure 30:
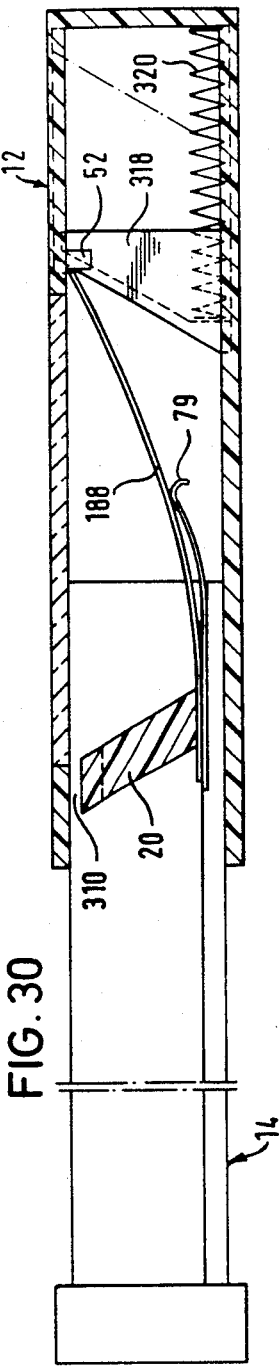
FIG. 30 is a longitudinal sectional view showing still another alternative embodiment.
Figure 31:
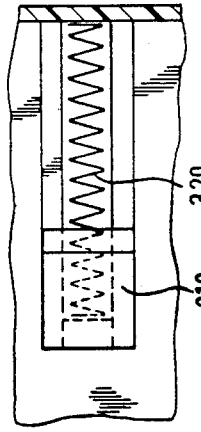
FIG. 31 is a top sectional view of a portion of FIG. 30.
Figure 32:
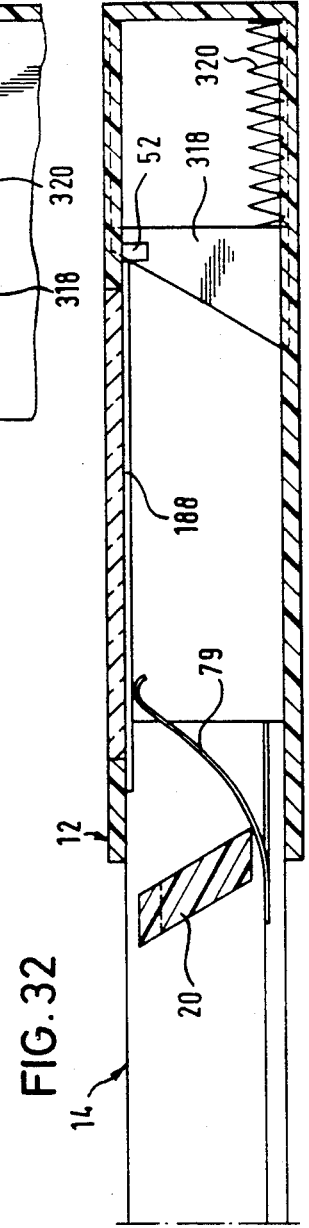
FIG. 32 is another longitudinal sectional view of the embodiment of FIG. 30 with the slider fully withdrawn.

Instead of the leaf spring 32, other means may be used in order to displace the edge of the individual sheet remote from the separator bar against the other housing edge. This is shown in FIG. 30: a guide member 318 has been pushed by a spring 320 beneath this edge of the sheet 188 and has raised it up in front of the pushing stop member 52, still during the first half of the changeover cycle. The other sheet edge is then, after the separator bar 20 has passed, lifted up by a leaf spring 79 in front of the return gap 310. Towards the end of the second phase of the changeover cycle, the separator bar then pushes the guide member 318 back. Instead of the spring 320, the guide member 318 could also, by means of coupling to the second frame part, but with a "phase shift", be moved to and fro by the latter. Instead of the movable guide member, inclined wing-like guide members which are capable of being pivoted in and out could be provided, without any change in the operating principle. FIG. 31 shows schematically a plan view of the guide member 318, and FIG. 32 represents the situation at the point of reversal of the changeover cycle.

Figure 33:
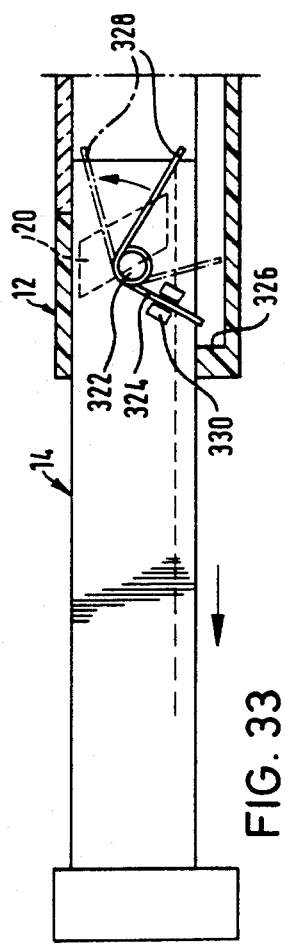
FIG. 33 is a partial longitudinal sectional view showing yet another alternative embodiment.

FIG. 33 shows a schematic side view of a mechanism which can be used instead of the lifting spring 79. A wire spring 324 is pivotable with its eye about a pin 322. One of its arms is angled and engages from outside transversely beneath the edge in question of the individual sheet, and the other arm can be moved over by engaging a stop member 326, carries the angled arm 328 along with it, and thus causes the edge of the sheet to be lifted. A limits-defining device 330 is indicated, in order to eliminate uncontrolled movements of the mechanism; the latter is indeed only to be switched over in the two end positions (rest position/point of reversal).

Figure 34:
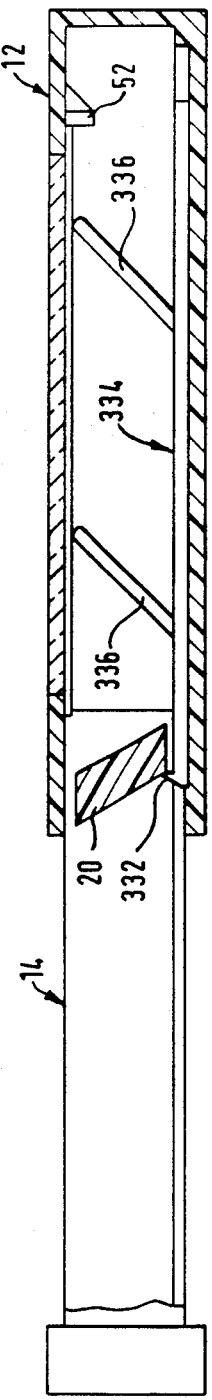
FIG. 34 is a longitudinal sectional view showing a still further embodiment.
Figure 35:
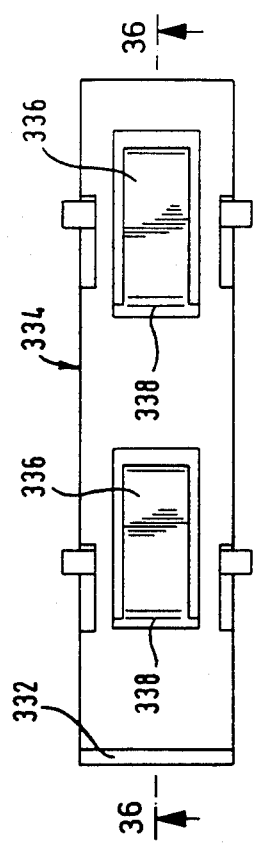
FIG. 35 is a top plan view of a portion of the device shown in FIG. 34.
Figure 36:
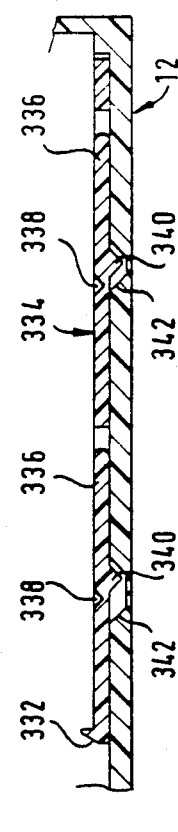
FIG. 36 is a partial sectional view taken along the line 36—36 in FIG. 35.

FIGS. 34 to 36 show an alternative form of the lever arrangement as guide means. The separator bar 20, shortly before its reversal position, meets a hook-like transporter 332 of a lever member carrier 334 to which two lever-like members 336 are linked by means of moulded-on pivots 338. By means of the displacement of the lever member carrier, the projections 340 formed on the underside of the lever-like members run onto actuating parts 342 of an actuator so that the lever-like members are raised up. During the return, the separator bar firstly meets the lever-like member nearest to it and presses the entire lever member carrier back for a short distance until the lever-like member is moved over; the other lever-like member, however, stays still, since the actuating parts 342 for the two lever-like members are at a greater distance from each other than the corresponding projections.

Figures 37, 38:
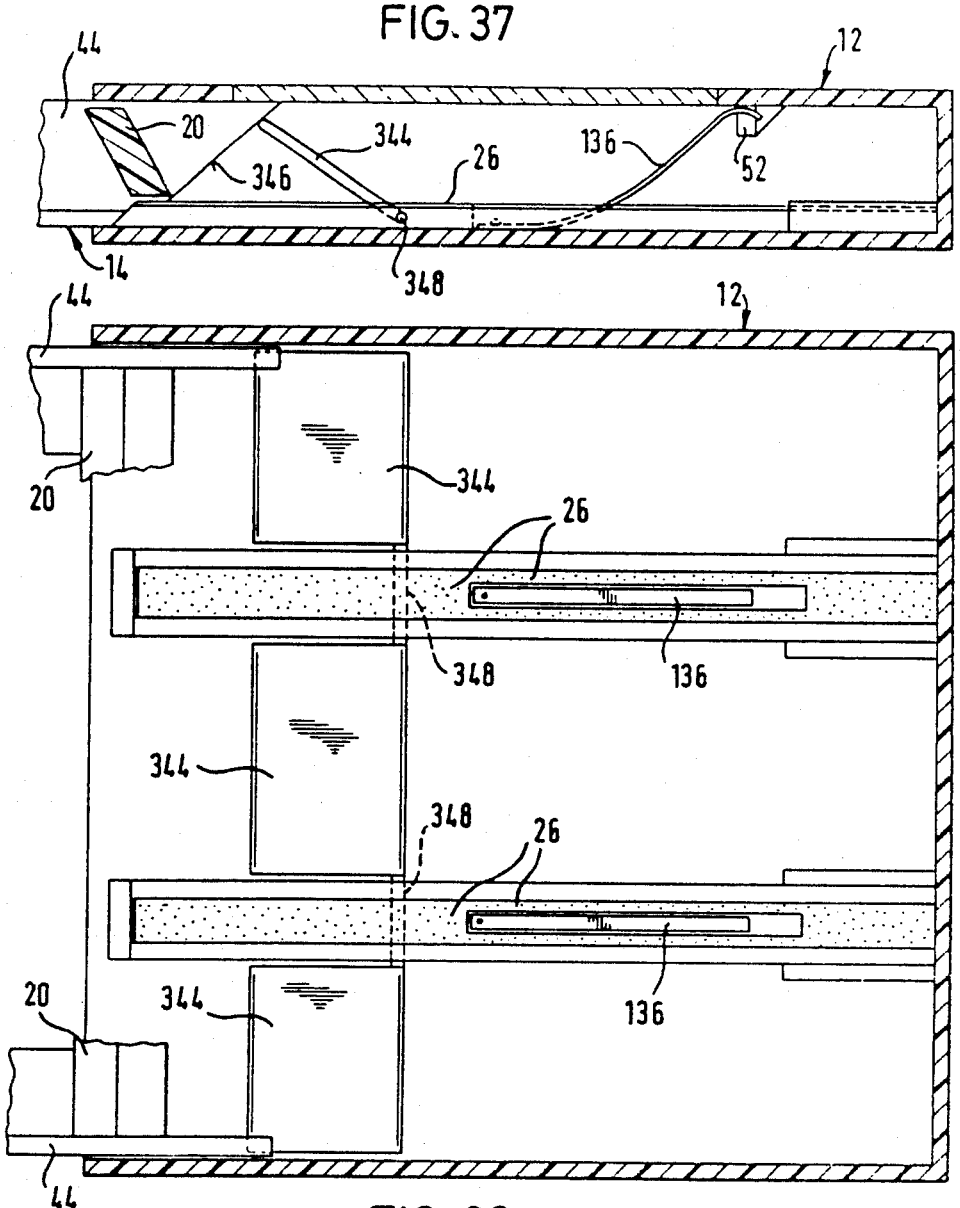
FIG. 37 is a partial longitudinal sectional view showing an alternative design to that of FIG. 34.
FIG. 38 is a top sectional view of the embodiment of FIG. 37 with some parts broken away.

The embodiment according to FIGS. 37 and 38 represents an embodiment in which the retaining means for the individual picture comprises retentive coatings 26 in the first frame part. As a result of static charging, as mentioned above, the individual sheet may adhere so firmly to the retentive coatings that considerable forces are requred to tear it away from them. It must however be guided onto the side of the frame part remote from the retentive coatings. The springs 136 are therefore provided centrally between two retentive coatings in each case. The edge of the individual sheet facing towards the separator bar 20 is lifted by a lever-like member 344 which is pressed down by means of actuator slopes 346 on the ends of the side pieces 44 of the slider member, while it is lifted up by a spring force (not illustrated). As can be seen from FIG. 18, the lever-like member extends over the entire width of the device, and in particular it also engages with the individual sheet directly adjacent to the retentive coatings. The shaft of the lever-like member is indicated by 348.

FIGS. 39 to 41 show another alternative form. On the separator bar 20, on both sides of the retentive coating 26, a thin plate-like member 350 is arranged so that it engages resiliently in a corresponding recess near the retentive coating. The two thin plate-like members are connected to each other by means of a bridge member 352. When the individual sheet runs through, each thin plate-like member is lifted up resiliently and snaps back into the recess after the rear edge of the sheet has passed, so that during the return travel the sheet edge in question is pulled away from the retentive coating and the edge has to climb up along the separator bar, since the return path through the other thorugh gap is now securely blocked by means of the thin plate-like members.

FIGS. 42 and 43 show how disruptions owing to faulty operation can be avoided, in the case that a use reverses the direction of movement of the frame parts before the outer or inner end position is reached. At certain critical places, faulty operation may occur. For this reason the blocking means shown here is provided.

In the bearing eye 116 of the slider member 14 there is pivotably arranged about a journal 160 a control pawl 162 which is guided by a control projection 164 along channels which are defined by guide rails 166 formed on the bottom shell 62, so that the control projection 164 has to follow the path marked by arows in FIG. 43 during insertion and withdrawal. During the greater part of the changeover cycle the direction of movement may be reversed without hindrance, but not when the control projection 164 is in the channel section 168 during insertion, or in the channel section 170 during withdrawal. In the first case, if it should be desired to pull the slider member out again shortly before its inner end position, the control projection would run onto the stop member 172; in the latter case if, therefore, the slider member is pushed in again shortly before reaching the outer end position the control projection hits either the stop member 174 or the stop edge 176. It should be noted that the journal 160 is seated in the bearing eye with a degree of friction such as to allow the control pawl to follow the guide bars without any noticeable hindrance, but not to be able to swing freely.

I claim:

1. A device for the cyclic rearrangement of a pile of rectangular or square sheets, especially a pile of photographic prints, with a first (12) and a second (14) frame part which are movable relative to each other and parallel to the principal plane of the pile, and with means which on movement of the frame parts backwards and forwards remove an individual sheet (188) from one end of the pile and add it to the other end of the pile again, which means comprise:

(a) a separating means (20/266) to separate an individual sheet (188) from the pile,
   (b) a feeding means (460) to feed sheets to the separating means,
   (c) retaining means (460/20) to hold the individual sheet in the first frame part and the remainder of the pile in the other frame part, and
   (d) a guide means (386) to guide the separated individual sheet for the purpose of returning it to the other end of the remainder of the pile, wherein the retaining means for holding the individual sheet is formed by a transporter (460) engaging the rear edge (seen in the feeding (or transport) direction) of the sheet to be separated and there is provided on the side of the pile remote from the transporter a pressure arrangement (476) which, during the outward travel of the frame parts, holds the sheet being separated in engagement with the transporter, and wherein means (490) are provided which, controlled by the movement of the frame parts, enable the introduction of the individual sheet between the pressure arrangement and the pile.

2. A device according to claim 1, in which the pressure arrangement comprises at least one pressure spring (476) which is arranged in the same frame part (12) as the transporter (460).

3. A device according to claim 2, in which the pressure spring (476), of which there is at least one, is displaceable in this frame part (12) as a function of the relative position of the two frame parts.

4. A device according to claim 3, in which the displacement occurs in one direction in such a manner that the pressure spring (476) runs at least for a substantial portion of the inward travel of the frame parts (12, 14) along the pile, but in front of the leading edge of the sheet (188) to be introduced between it and the pile.

5. A device according to claim 3, in which the displacement occurs in one direction in such a manner that an additional pressure spring is held away from the pile during at least a part of the inward travel of the frame parts (12, 14).

6. A device according to claim 5, in which the additional pressure spring is held away by the running-on of a separating element (20) of the separating means.

7. A device according to claim 3, in which, during each change cycle, the pressure spring (476) is displaced near to the maximum pulled-out position of the frame parts (12, 14) into one position and near to the completely pushed-in position of the frame parts back into the other position.

8. A device according to claim 1, in which the transporter (460) forms also an element of the feeding means.

9. A device according to claim 1, in which the pressure arrangement holds the sheet being separated in contact with the transporter at least until shortly before the transporter enters the separating means.

10. A device according to claim 1, in which the separating means comprises:
   (i) a separator bar in said second frame part, said bar having surface portions for engaging those borders of the sheets in said pile which are trailing upon the start of said reciprocation from the closed position, one of said frame parts having a support positioning said individual sheet in said one frame part, said bar having an end edge facing said support,
   (ii) spacing means cooperating with said separator bar for defining a distance between said support and said end edge for entry of said individual sheet positioned in said one frame part, said distance being greater than the thickness of one sheet and less than the thickness of two sheets, and
   (iii) spring means acting upon said spacing means for maintaining said distance for entry of said individual sheet.

11. A device according to claim 1, having guide means which convey the end of the individual sheet facing the separating means at right-angles to the direction of movement of the frame parts in front of a return through-gap.

12. A device according to claim 1, in which one of the frame parts has a viewing window and the two frame parts are coupled by a selectively unidirectionally movable free-wheel-type device which, at least over some regions of the movement of the frame parts, prevents a change in the direction of movement.

13. A device according to claim 1, in which the second frame part is designed as a slider member (14) which can be pulled out of the first frame part formed by a housing (12) and from which the pile can be removed when the slider member is pulled out.

14. A device according to claim 1 wherein a rotation-preventing means is provided for said individual sheet during said movement of the frame parts to secure said individual sheet against rotation about an axis perpendicular to the plane defined by said individual sheet.

15. A device according to claim 1 wherein said retaining means include first and second retaining systems disposed on said first frame part, said first retaining system holding said individual sheet at the beginning of the relative movement of said frame parts to remove said individual sheet, said second retaining system holding said individual sheet at the end of the relative movement of said frame parts to remove said individual sheet, and both of said retaining systems holding said individual sheet between said beginning and end of the relative movement of said frame parts to remove said individual sheet.

* * * * *